United States Patent
Ferris et al.

[11] 3,765,124
[45] Oct. 16, 1973

[54] HELICOPTER ROTOR BLADE

[75] Inventors: Donald L. Ferris, Newton; Robert J. Worrell, Ansonia, both of Conn.

[73] Assignee: United Aircraft Corporation, East Hartford, Conn.

[22] Filed: July 19, 1972

[21] Appl. No.: 273,230

[52] U.S. Cl. .................................. 416/226, 416/61
[51] Int. Cl. ... B64c 11/16, B64c 27/00, B64c 27/46
[58] Field of Search .............................. 416/226, 61

[56] References Cited
UNITED STATES PATENTS

| | | | |
|---|---|---|---|
| 2,954,828 | 11/1960 | Marchetti | 416/226 |
| 3,667,862 | 6/1972 | Parr | 416/226 |
| 3,691,820 | 9/1972 | Fiore | 416/61 |
| 3,155,166 | 11/1964 | Stulen et al. | 416/226 |
| 3,547,555 | 12/1970 | Jensen | 416/61 |
| 3,323,597 | 6/1967 | Longobardi et al. | 416/226 |

*Primary Examiner*—Everette A. Powell, Jr.
*Assistant Examiner*—Louis J. Casaregola
*Attorney*—Maurice B. Tasker et al.

[57] ABSTRACT

A helicopter rotor blade has a tubular spar extending lengthwise of the blade which forms the main strength member of the blade. The spar is closed at both ends to contain a gaseous fluid under pressure and has pressure indicating means responsive to pressure loss due to a leak caused by a crack in the spar wall. A continuous skin of fluid impervious material is wrapped chordwise about the spar and extends fore and aft of the spar to form the airfoil contour of the blade. A honeycomb filler is provided in the space aft of the spar. To collect leakage gases from a cracked spar, a series of ribbed blankets are wrapped about the spar along its length with their ribs contacting the spar to form longitudinal fluid passages between ribs. These are interconnected by transverse generally chordwise passages between the ribs of adjacent blankets which lead to a fluid collecting port extending along the trailing edge of the spar. The honeycomb cells aft of the spar are interconnected by holes in the cell walls and some of these cells connect with the spanwise collecting port at the trailing edge of the spar and provide a sump for leakage fluid within the blade of sufficient volume to give the required pressure drop within the spar to indicate a crack in the spar.

12 Claims, 8 Drawing Figures

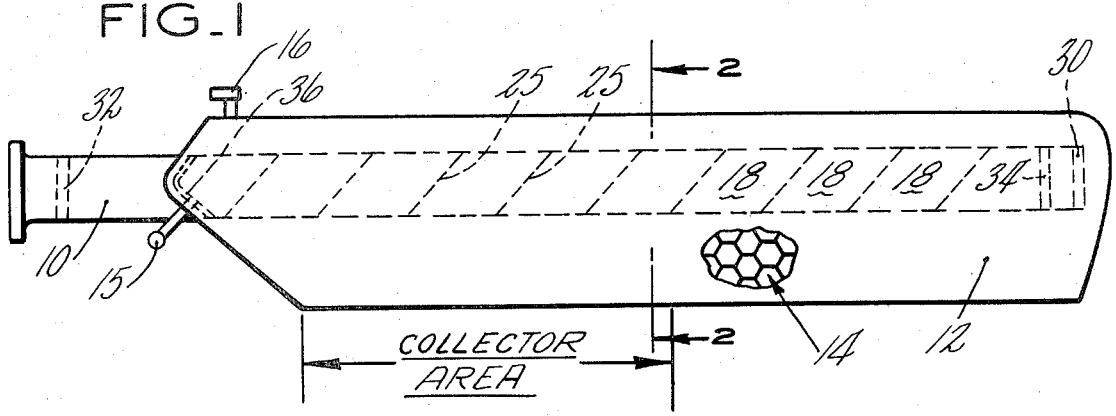
FIG. 1
COLLECTOR AREA
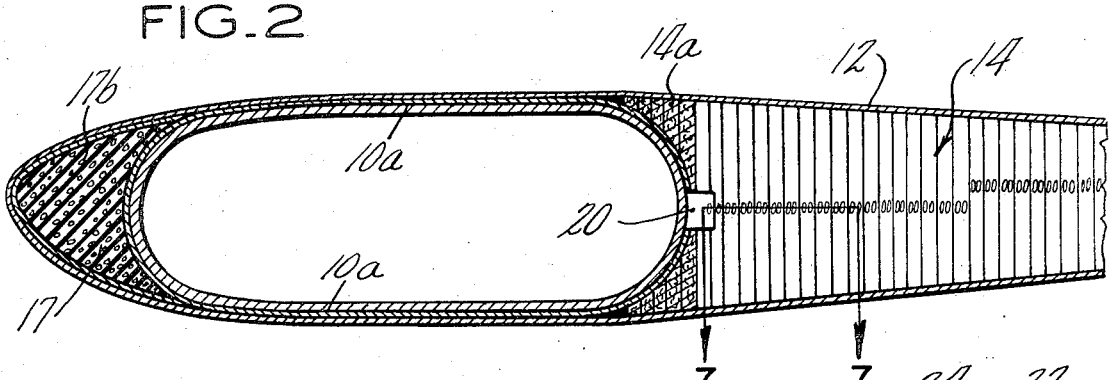
FIG. 2
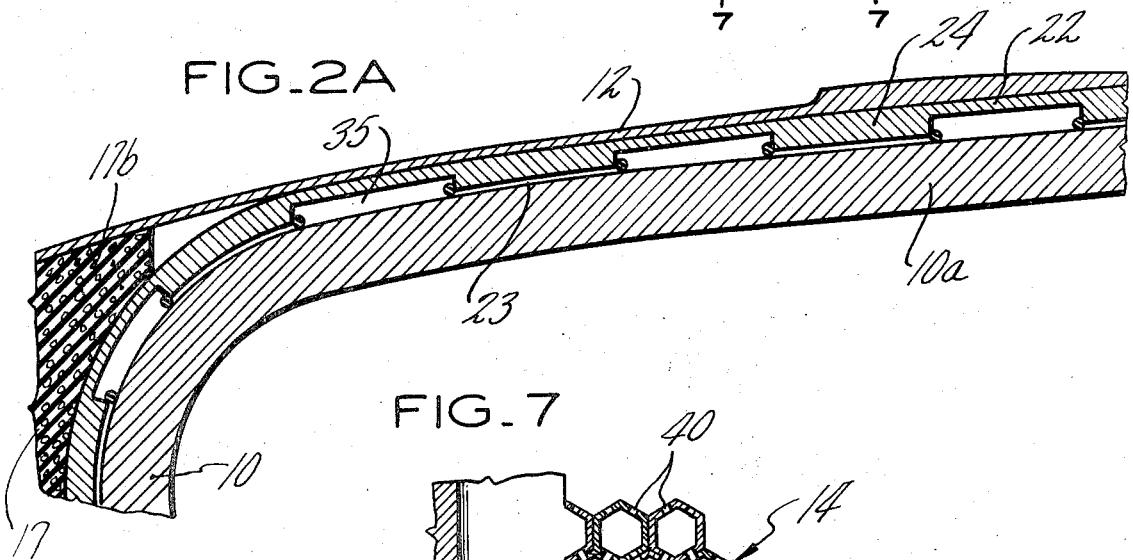
FIG. 2A
FIG. 7

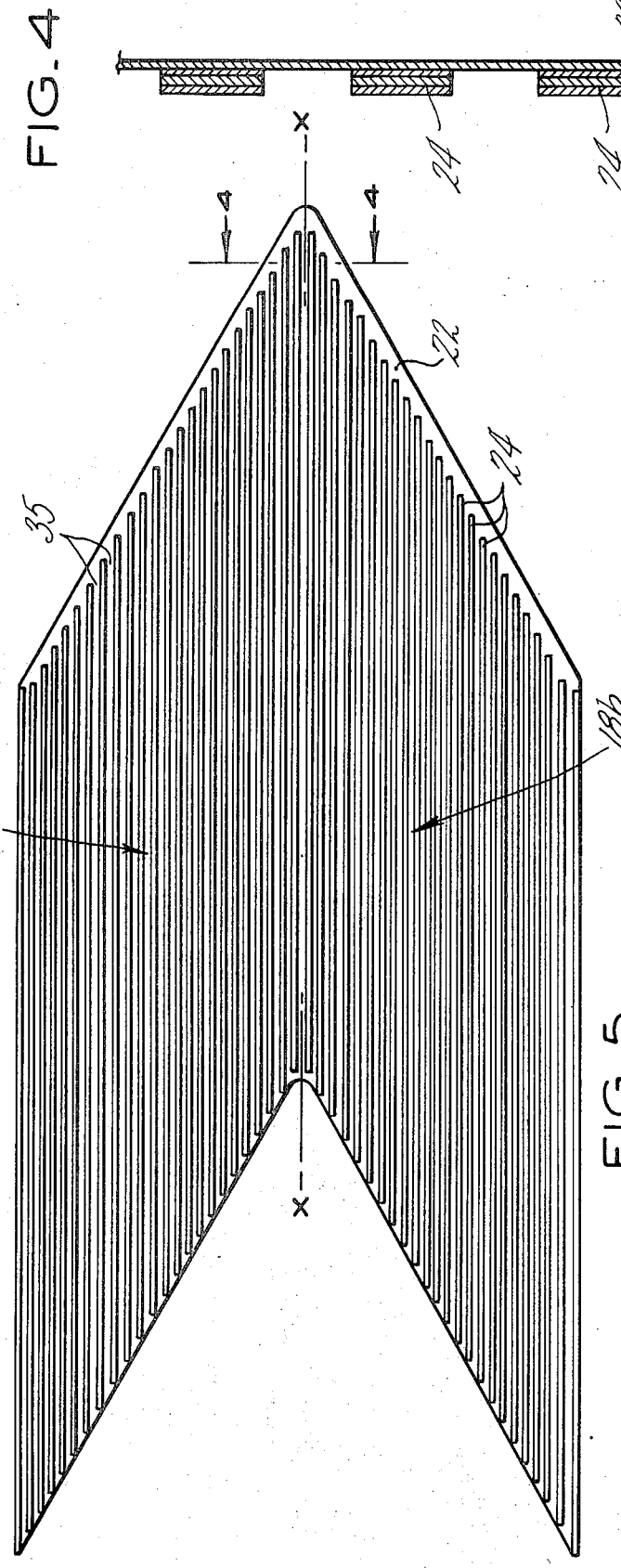
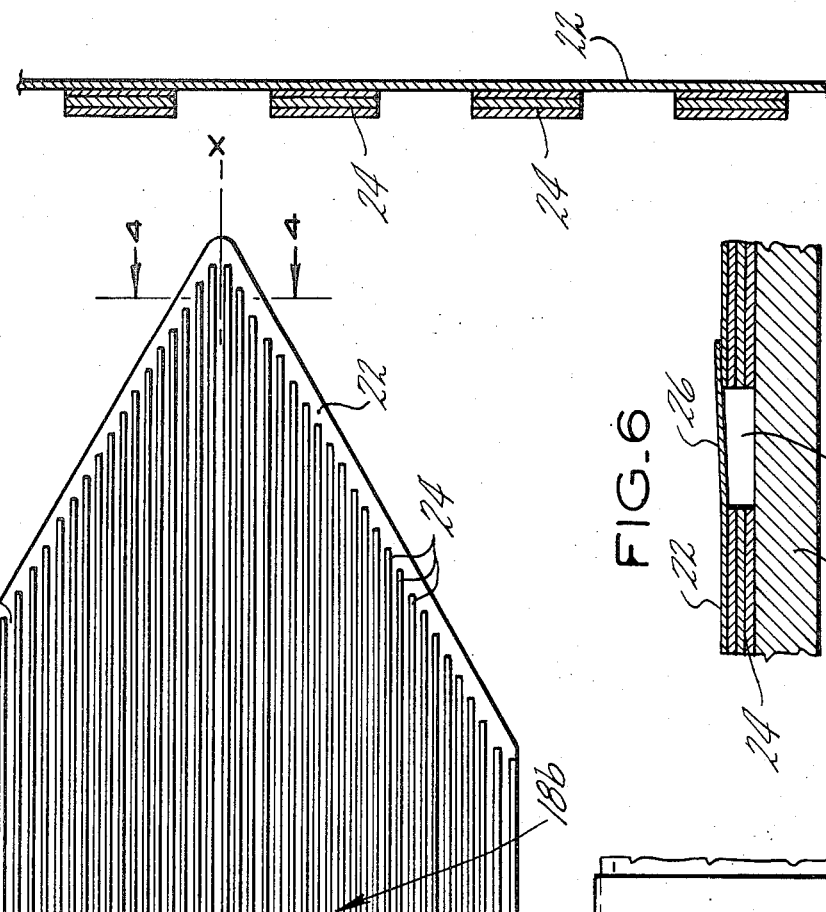
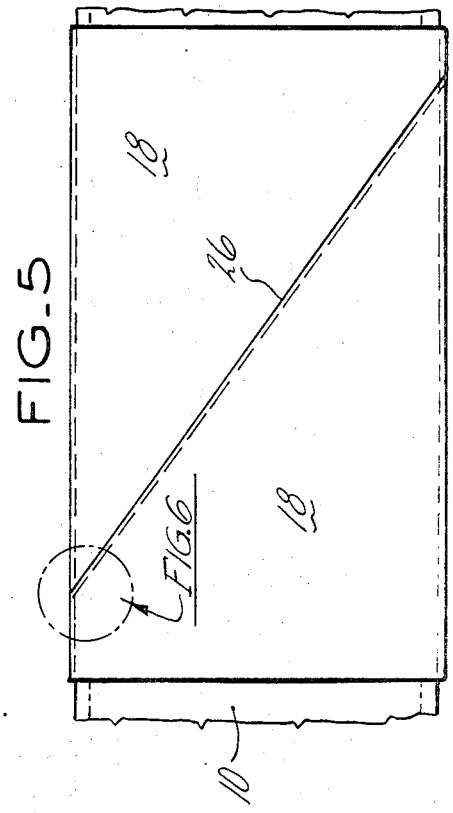
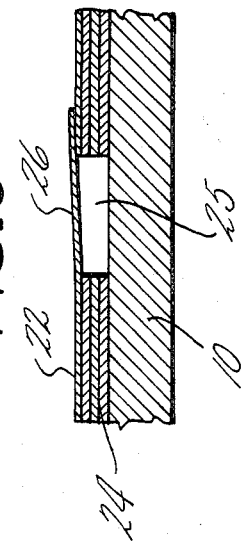

HELICOPTER ROTOR BLADE

BACKGROUND OF THE INVENTION

1. Field of the Invention

This invention relates to helicoptor rotor blades in which the main strength member of the blade consists of a pressurized hollow spar having indicating means responsive to pressure loss upon formation of a crack in the spar wall.

2. Description of the Prior Art

Prior to this invention the hollow spar has constituted the leading portion of the blade and the airfoil contour of the blade has been completed by attaching sheet metal box sections to the trailing edge of the spar. This construction allowed leakage through a crack in a pressurized spar to pass directly to atmosphere. A blade of this type is shown in U.S. Pat. No. 2,754,918, issued July 17, 1956 to M. Gluhareff.

With the development of the so-called wrap-around blade in which the spar is wholly surrounded by fluid impervious material including an outer skin, venting of the leakage fluid has been accomplished by providing a few spanwise ducts in the impervious material surrounding the spar adjacent the surface of the spar where the escaping fluid was collected and from which they were discharged at the blade tip to the atmosphere. Although a lightly loaded valve was provided at the tip of the blade to prevent entrance of moisture, there was the danger that the valve might stick open and allow moisture to enter the blade or become obstructed and prevent escape of leakage gases. A blade of this type is disclosed in a related application of Thomas P. Dixon, Ser. No. 225,778, filed Feb. 12, 1972 assigned to the assignee of this application.

SUMMARY OF THE INVENTION

It is an object of this invention to provide an improved venting system for the pressurized spar of a wrap-around rotor blade in which the blade is sealed against communication with the atmosphere to prevent accumulation of moisture within the blade which can cause cracking of the blade skin under severe freezing conditions.

It is a further object of this invention to provide such a sealed-blade construction in which the leakage gases from a cracked spar are accommodated within the blade while providing a sufficient pressure drop-off within the spar to indicate the presence of a crack in the spar on a pressure indicator.

It is another object of this invention to provide improved means for collecting the leakage fluid from the spar which makes it virtually impossible for a crack to form in the spar which does not communicate in its incipient stage directly with one or more fluid ducts in communication with the spar surface.

More specifically it is an object of this invention to provide a series of impervious blankets having a grid on one side which are wrapped about the spar along its length with the grids adhesively secured to the surface of the spar; to provide spanwise and chordwise ducts for conveying the leakage fluid to a storage sump within the blade; to provide a spanwise fluid collecting port along the trailing edge of the spar; and to provide passages leading from the collecting port to a sump which comprises a plurality of interconnected honeycomb cells and is of sufficient volume to provide the required drop-off in pressure within the spar.

A further object of this invention is generally to improve the construction and performance of rotor blades having pressurized spars.

Other objects and advantages of the present invention may be seen by referring to the following description and claims, read in conjunction with the accompanying drawings.

BRIEF DESCRIPTION OF THE DRAWINGS

FIG. 1 is a plan view of a helicopter rotor blade embodying the novel features of the invention;

FIG. 2 is a cross-sectional view on an enlarged scale taken on line 2—2 of FIG. 1, parts being broken away for purposes of illustration;

FIG. 2A is a detail on a much enlarged scale of a portion of FIG. 2 in the vicinity of the leading edge of the spar;

FIG. 3 is a plan view of one of a plurality of grid blankets which are wrapped chordwise about the spar along its length;

FIG. 4 is an enlarged sectional view taken on line 4—4 of FIG. 3;

FIG. 5 is a view of a short spanwise portion of the bottom of the spar showing the meeting edges of two adjacent blankets;

FIG. 6 is an enlarged view of the meeting edges of the blankets shown in FIG. 5 showing the fluid tight seal between adjacent blankets; and FIG. 7 is a section on line 7—7 of FIG. 2 showing the fluid connections between the main collecting port along the trailing edge of the spar and the honeycomb area for storing this fluid.

DESCRIPTION OF THE PREFERRED EMBODIMENT

Referring first to FIGS. 1 and 2, a rotor blade is shown having a tubular spar 10 which is flattened at its top and bottom to conform to the airfoil contour of the blade in these areas. A continuous wrap-around shell, or skin, 12 of metal, fiberglass or composite material which overlies the generally parallel flattened portions 10a of the spar extends fore and aft of the spar to complete the airfoil contour of the blade. In the blade shown the spar 10 is made of titanium and the skin 12 is made of fiberglass. The skin portion is completed by securing its edges together at the trailing edge of the blade, as by bonding. In other embodiments to which this invention is applicable, the trailing aerodynamic portion may merely overlap a portion of the spar and the closed spar may be of any shape such as circular or elliptical.

The space within the skin aft of the spar is occupied by honeycomb filler 14 (FIG. 2) which is arranged with the longitudinal axes of the cells transverse to the skin surface at the top and bottom of the blade. The honeycomb cells in contact with the aft wall of the spar may be filled with a hardenable foam material 14a such as polyeurethane. A mixture of elastomer 17 and lead shot 17b may be used as a counterweight to assist in balancing the blade.

Spar 10 is adapted to be filled with a gaseous fluid under pressure which is introduced through valve 15. A pressure responsive indicator 16 is provided to indicate visually a drop in pressure within the spar which may result from a crack in the spar. It is immaterial to this invention whether the indicator be of the external visual type attached to the blade, as shown, or whether the cockpit type using a transducer and signal device be used.

It will be evident that in the blade shown herein, as in all wrap-around blades, the spar is surrounded on all sides by fluid impervious material. The areas 10a of the spar are surrounded by the fiberglass skin and the remainder of the spar is surrounded by elastomer counterweight or honeycomb filler, which is likewise impervious to fluid escaping from a crack in the spar.

To assist in collecting the escaping fluid from a cracked spar, a plurality of blankets 18 are wrapped about the leading edge of the spar along its length and extend aft over the entire chordwise surface of the spar except for a collecting port 20 (FIG. 2) of limited width which extends along the trailing edge of the spar along its entire length. One of these blankets 18 is shown in plan view in FIG. 3 and consists of a sheet of fiberglass 22 on one surface of which a plurality of parallel, closely spaced and narrow ribs of fiberglass 24 are adhesively secured to form a grid. Layers of metal (i.e. titanium strips) may be utilized as an alternate to fiberglass for forming ribs. As shown in FIG. 4, the ribs 24 are formed of a plurality of layers of fiberglass adhesively secured together. The ribs may also be formed by machining parallel grooves in a lay-up of fiberglass sheets. In FIG. 3 a line X—X indicates the longitudinal centerline of the blanket which is applied to the leading edge of the spar with the grid surface confronting the surface of the spar. It will be seen that the line X-X divides the blanket into two equal areas 18a and 18b of parallelogram shape so that when the blanket is wrapped about the spar the edges of adjacent blankets along the spar lie along oblique lines, as shown in FIG. 1, and the ribs extend spanwise of the spar. The balnkets are secured to the spar by suitable adhesive 23 as shown in FIG. 2A between the ribs and the spar.

The adjacent ends of the ribs 24 of the several blankets 18 along the spar do not abut each other but are slightly spaced to provide oblique chordwise passages 25 (FIGS. 1 and 6) which, of course, will communicate with all of the spanwise ducts between the ribs of the blanket as well as with the spanwise collecting port 20 along the trailing edge of the spar. Since blade cracks tend to propagate circumferentially around the tubular spar, the staggered, or oblique, terminating of the ribs eliminates the possibility of there being a chordwise passage at the path of the crack. It will be noted in FIG. 3 that, while the ribs 24 extend to the edge of the blanket 18 at the left-hand end of the blanket, they terminate somewhat short of the right-hand edge, leaving an edge portion 26 which extends across passage 25, overlaps the adjacent blanket and is adhesively secured thereto. Thus the blankets form a continuous structural part of the spar assembly and contribute materially to the strength of the spar. The attaching of the ribs of the blanket to the blade spar achieves the additional benefit that the ribs act as crack stoppers which either slow the rate of propagation or completely stops it.

In the related application referred to above, a wrap-around blade is shown in which the leakage gases from the spar are collected and discharged to atmosphere through a valve at the tip of the blade. Although the valve is lightly spring loaded, it is possible for atmospheric moisture to get into the blade through the vent and cause damage to the blade under severe icing conditions. This is impossible with a blade constructed in accordance with the present invention.

The fiberglass skin of the blade is sealed at both ends. The spar is sealed by plugs 30, 32 at its tip and root end respectively. Also the blanket shroud is sealed at its tip end at 34 and at its root end at 36. The fluid escaping from a crack in the spar will flow along one or more of the spanwise ducts 35 between adjacent ribs of the blanket, through one or more of the oblique passages 25 between adjacent blankets into the spanwise collecting port 20 at the trailing edge of the blade spar. Instead of venting this fluid to atmosphere, in accordance with this invention, it is vented into a storage area, or sump, within the sealed blade of sufficient capacity to provide the required drop-off in pressure in the cracked spar to give a clear indication on indicator 16.

To this end a section of the honeycomb filler 14 aft of the spar, indicated in FIG. 1 as the collector area is used to store the escaping fluid. Since the honeycomb cells are sealed at their ends by skin 12, to which the honeycomb is adhesively secured, holes 40 are provided in the sidewalls of the cells to provide free communication between cells. Honeycomb can be purchased with perforated walls but it has been found that these perforations are too small and are easily clogged with adhesive. By collapsing the honeycomb it is possible to drill larger holes 40 through the sidewalls of a plurality of adjacent cells at one time which will be large enough to be free from this difficulty. FIG. 7 shows a few adjacent cells prepared in this manner to provide free fluid communication between cells in the collector area. Also it will be evident from FIG. 7 that these cells are in free communication with collecting port 20 all along the spar in the collector area.

The operation of the structure disclosed will be obvious from the above description. Regardless of where a crack may originate in the spar throughout its length, due to the narrowness of the ribs and their close spacing, the crack will cut across one or more of the spanwise ducts 35 between ribs of one or more blankets and the leaking gas will be conducted through oblique passages 25 between blankets to collecting port 20 and to the honeycomb cells of the collector area.

The total storage capacity for leakage fluid includes all of the spanwise inter-rib passages 35 of all the blankets, the oblique passages 25 between blankets, the collecting port 20 which extends the entire length of the blade, and the cells of the honeycomb in the collector area. This network of interconnected ducts leading to the storage area so thoroughly covers the spar surface that a crack anywhere on the spar surface will be able to vent fluid immediately even in its incipient stage of formation.

Since there is not communication between the interior of the blade and the atmosphere, there is no possibility for condensation of moisture from the atmosphere within the blade or for entrance of other contaminating material from the air outside the blade. Further, the grid blanket cooperates with the hollow spar to provide a unitary spar assembly of greatly increased strength in which both spanwise and chordwise ducts are provided for collecting leakage fluid.

While one specific embodiment of the invention has been shown and described in considerable detail herein, we do not want to be limited to the exact details of construction shown herein. The use of gaseous fluid channels and a storage sump is equally adaptable to a blade wherein a vacuum is drawn within the spar rather than the application of pressure. Various fluids such as nitrogen may be used. Obvious modifications within the scope of the following claims will occur to persons skilled in this art.

We claim:

1. In a rotor blade, a spar closed at both ends and adapted to contain a fluid under pressure, a pressure responsive indicator for indicating change of pressure within said spar, an outer blade skin providing a fluid tight enclosure for said spar which forms the airfoil contour of the blade, fluid impervious filler material occupying the space between said spar and said skin having spanwise channels therein which confront the exterior surface of said spar, a portion of said filler material comprising a cellular material in which the cells are in fluid communication with each other and form a fluid sump within the blade of sufficient volume to produce the required pressure change in said spar to actuate said pressure indicator upon occurrence of a crack in said spar, and means for connecting said sump to said spanwise channels including spanwise-spaced ducts in said impervious material transverse to said channels.

2. The rotor blade of claim 1 in which the cellular material forming the sump comprises perforated honeycomb material in which the longitudinal axes of the cells are transverse to the top and bottom surfaces of the blade.

3. The rotor blade of claim 1 in which the fluid impervious material between the spar and the skin includes grid blankets wrapped chordwise about the spar along its length forming the spanwise channels and terminating a little short of the trailing edge of the spar to form a spanwise collecting port at said trailing edge with which the transverse ducts are in fluid communication.

4. The rotor blade of claim 3 in which each of the grid blankets comprises a backing sheet of fluid impervious material wrapped about the spar having chordwise-spaced grid bars which extend spanwise of and are adhesively secured to said spar.

5. The rotor blade of claim 4 in which the backing sheets of the several blankets disposed spanwise along the spar are overlapped at their spanwise ends and adhesively secured to each other and the confronting ends of the grid bars of adjacent blankets are spaced to provide the transverse ducts.

6. In a rotor blade, a tubular spar closed at both ends and adapted to contain a gaseous fluid under pressure, a pressure responsive indicator communicating with the interior of said spar for indicating loss of pressure due to a crack in said spar, a skin forming a fluid tight enclosure for said spar which extends fore and aft of said spar to complete the airfoil contour of the blade, a plurality of grid blankets wrapped chordwise about said spar along its length having their ends terminating at the trailing edge of the spar in spaced relation to form a spanwise collecting port, each blanket comprising a backing sheet having spaced grid bars secured thereto on the side adjacent said spar to form spanwise ducts, means for adhesively securing said grid bars to said spar, the confronting ends of the bars of adjacent blankets being spaced to form chordwise ducts transverse to the spanwise ducts between said bars which transverse ducts communicate with said collecting port, and a sump for leakage fluid including honeycomb material occupying the space within said skin aft of said spar, the cells of said honeycomb material having holes in their side walls establishing fluid communication between said cells and said collecting port at the trailing edge of the spar.

7. In a rotor blade, a tubular spar closed at both ends and adapted to contain a gaseous fluid under pressure, a skin wrapped chordwise around the major portion of the length of said spar and extended fore and aft beyond said spar to form the airfoil contour of the blade, said skin forming a fluid tight enclosure for the enclosed portion of said spar, fluid impervious material between said spar and said skin including a grid blanket wrapped chordwise about said spar having its spanwise edges spaced at the trailing edge of the spar to form a collecting port for escaping gases from said spar, said blanket comprising a backing sheet having spanwise grid bars on the inner face thereof which contact the spar and form spanwise channels between bars, said bars being interrupted at spaced intervals along said spar to provide chordwise ducts transverse to the spanwise channels which are in communication with said collecting port, and a sump for leakage fluid in the space between said skin and said spar comprising perforated honeycomb filler material, some of the intercommunicating cells of said filler material having fluid communication with said collecting port.

8. The rotor blade of claim 7 in which the grid blanket is formed of a plurality of interconnected short spanwise sections having overlapping chordwise ends which are adhesively secured together, each blanket section having grid bars which terminate short of at least one end of its chordwise ends to form said chordwise ducts for conveying leakage fluid from the spanwise channels to said collecting port.

9. The rotor blade of claim 8 in which the chordwise ends of the blanket sections extend from the leading edge of the spar obliquely across the top and bottom faces of the spar.

10. In a helicopter rotor blade, a hollow spar closed at both ends and adapted to contain a fluid under pressure, a pressure responsive indicator responsive to changes in pressure within said spar, a blade skin of fluid impervious material enclosing said spar and extended chordwise of the spar to complete the airfoil contour of the blade, fluid impervious filler material in the space between said spar and said skin, and a series of blanket sections wrapped chordwise about the leading edge of the spar along its length having their ends terminating in confronting spaced relation at the trailing edge of said spar to form a spanwise collecting port for fluid escaping through a crack in said spar, said blanket sections having spanwise ribs on their inner surfaces which contact said spar and form spanwise channels for collecting fluid leaking from said spar, the ribs of adjacent blanket sections having their ends spaced apart to form chordwise ducts which connect said spanwise channels with said collecting port.

11. The blade of claim 10 in which the adjacent edges of said blanket sections overlap and are adhesively secured together to form a fluid tight seal.

12. The blade of claim 11 in which the adhesively sealed edges of said blanket sections lie oblique to the longitudinal axis of said spar.

* * * * *